United States Patent Office 2,763,497
Patented Sept. 18, 1956

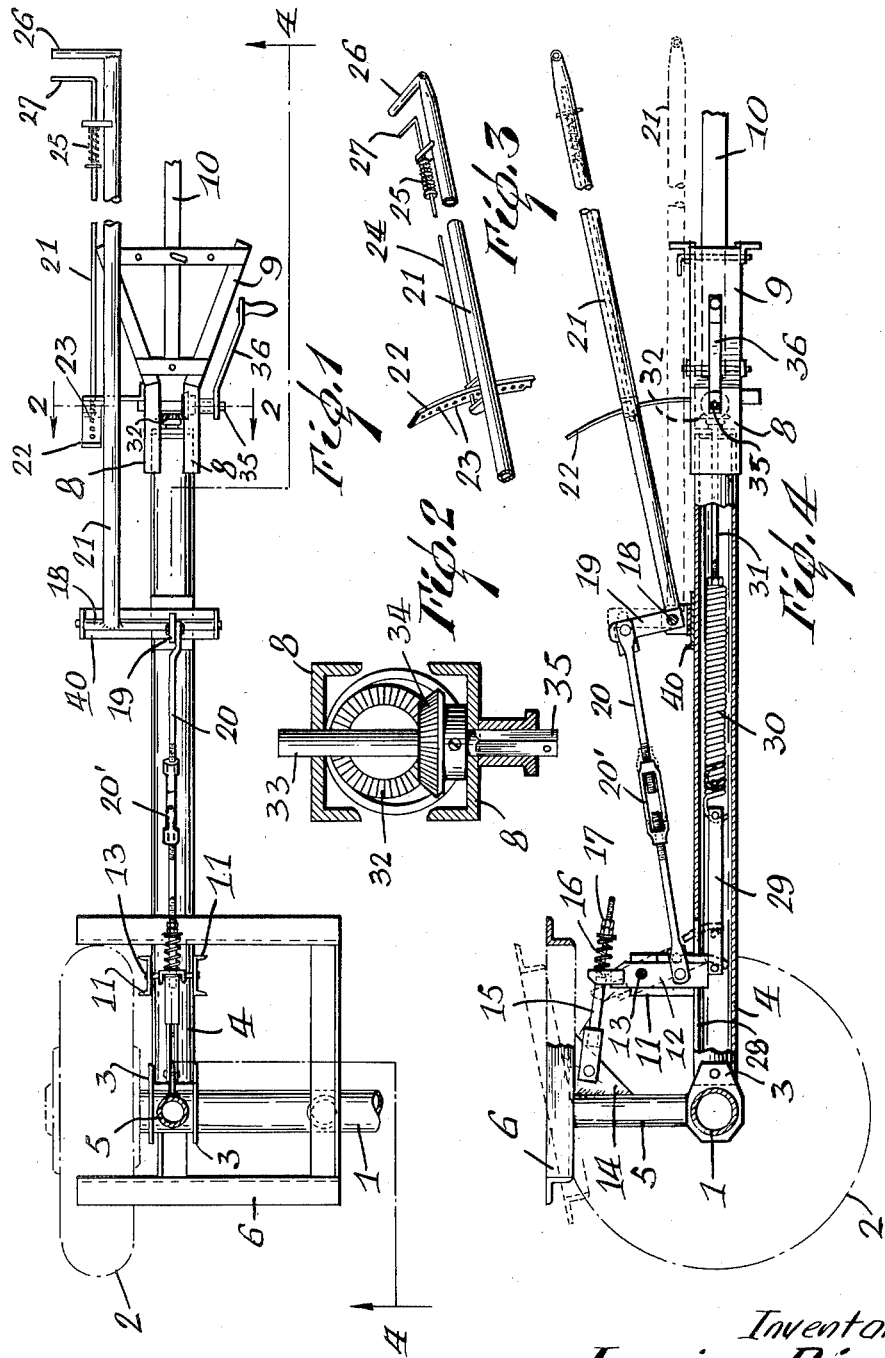

2,763,497
WHEELED VEHICLE WITH ADJUSTABLE FRAME

Lucien Dion, Ste. Therese de Blainville, Quebec, Canada, assignor to Dion Freres Inc., Ste. Therese de Blainville, Quebec, Canada Application October 12, 1953, Serial No. 385,617

3 Claims. (Cl. 280—490)

Certain types of vehicles carry an implement-supporting frame that is fixed rigidly to an axle. An example of such a machine is one that carries a picker, for agricultural purposes, as the implement on the frame. The relation of the implement to the ground level must be constant. On the other hand, the tractors used to pull the working vehicles vary in size. As a result, the vehicle may be connected to the tractor at varying heights, thus disturbing the relation of the implement to the ground surface.

The principal object of this invention is to provide means for compensating this disturbance, that is, for selectively adjusting the frame on the axle, so that the proper working position of the implement is restored and maintained. Another object is to provide a simple, inexpensive and reliable construction for this purpose.

In the accomplishment of these objects, a lever and link system is mounted on the draw bar of the vehicle for rocking the frame to make the necessary compensation. There is also provided a means for locking the adjustment to maintain the desired relation of the implement to the ground.

A further object of the invention is to provide a counterbalance for the adjustable frame with means for adjusting it as required.

The invention is fully disclosed by way of example in the following description and in the accompanying drawings in which:

Figure 1 is a plan view of the device;
Figure 2 is a section on the line 2—2 of Figure 1;
Figure 3 is a detail perspective view; and
Figure 4 is a section on the line 4—4 of Figure 1.

Reference to these views will now be made by use of like characters which are employed to designate corresponding parts throughout.

In Figures 1 and 4 is shown the axle 1 of a machine to be pulled. On the axle 1 are the ground wheels 2, and to the axle are secured a pair of plates 3 between which a draw bar 4 is attached. A normally vertical leg 5 is secured on the axle 1 and carries a base 6 to support a motor which in turn carries and operates an implement such as a picker (not shown). At the other end of the bar 4 are fixed a pair of opposed U plates 8 forming part of a frame 9 to which the draft tongue 10 of the tractor is attached.

Vertical plates 11 are secured to opposite sides of the bar 4 near the axle 1. A lever 12 is pivoted between the plates on a pin 13. Beneath the frame 6 is a bracket 14 to which is pivoted a rod 15 that passes through the lever 12. Forward of the lever 12, a coil spring 16 surrounds the rod 15 and is backed by nuts 17.

A bracket 40 is secured at an intermediate point on the bar 4 and supports a cross shaft 18. A lever arm 19 is secured to the cross shaft and is connected to the lever 12 by a divided link 20 adjustable by a turnbuckle 20'. An operating lever 21 is also fixed to the shaft 18 and extends forwardly, forming a bell crank lever with the arm 19.

The lever 21 swings along an arcuate adjustment plate 22 with apertures 23, secured to the bar 4. Along the lever 21 is slidably mounted a locking rod 24 backed by a spring 25 and adapted to enter a selected aperture 23. The parts 21 and 24 have adjacent lateral handles 26, 27 for easy manipulation of the rod 24.

The lower end of the lever 12 works in a slot 28 in the bar 4. To this lower end, within the bar, is pivoted a link 29. The link is joined by a coil spring 30 to another link 31 which carries a bevel pinion 32 between the plates 8. A transverse shaft 33 is journalled between the plates and carries a bevel pinion 34 meshing with pinion 32. An outer end of the shaft 33 is squared at 35 to receive a crank 36 as shown in Figure 1.

In the use of the device, the picker or other implement carried by the frame 6 must maintain a given level or height from the ground. It is the preferred and common practice to have the frame 6 supported from the axle 1 as shown. The users employ tractors of varying sizes, and hence the height of the point of attachment of the draft tongue 10 to the tractor is not constant. This condition alters the angle of the draw bar 4 and frame 6 and thus the distance of the implement from the ground.

The instant device provides for compensation by adjustment of the frame 6, on which the relative position of the implement depends. The adjustment is made by adjustably locking the lever 21 in the plate 22, thereby swinging lever arm 19, shifting link 20, swinging lever 12, and tilting the frame 6 through the rod 15 which is cushioned by spring 16. An adjusted position of the frame is shown in dotted lines in Figure 4.

The movement is counterbalanced by the spring 30. If adjustment of this spring is needed, it is effected by turning the crank 36 to wind the spring one way or the other through the pinions 32, 34.

Although a specific embodiment of the invention has been illustrated and described, it will be understood that various alterations in the details of construction may be made without departing from the scope of the invention as indicated by the appended claims.

What I claim is:

1. In a wheeled vehicle, an axle, ground wheels carried thereby, a frame rigidly supported on said axle, a draw bar extending from said axle, a vertical lever pivotally supported above and from said bar, a spring backed connection from one end of said lever to said frame, means for operating the other end of said lever, means for locking the first means relatively to said bar, and a counterbalancing spring connected to said other end of said lever.

2. In a wheeled vehicle, an axle, ground wheels carried thereby, a frame rigidly supported on said axle, a draw bar extending from said axle, a vertical lever pivotally supported from said bar, a connection from one end of said lever to said frame, means for operating the other end of said lever, means for locking the first means relatively to said bar, a link in said bar and connected to said other end of said lever, a coil spring attached to said link, another link attached to said coil spring, and means for turning the second link to adjust said spring.

3. In a wheeled vehicle, an axle, ground wheels carried thereby, a frame rigidly supported on said axle, a draw bar extending from said axle, a vertical lever pivotally supported from said bar, a connection from one end of said lever to said frame, means for operating the other end of said lever, means for locking the first means relatively to said bar, a link in said bar and connected to said other end of said lever, a coil spring attached to said link, another link attached to said coil spring, a pinion on the second link, and means for turning said pinion to adjust said spring.

References Cited in the file of this patent
UNITED STATES PATENTS

| | | |
|---|---|---|
| 901,701 | Gerling | Oct. 20, 1908 |
| 1,354,654 | Johnston et al. | Oct. 5, 1920 |
| 1,775,297 | Towner | Sept. 9, 1930 |
| 2,546,531 | Vutz | Mar. 27, 1951 |
| 2,595,474 | Marvin | May 6, 1952 |
| 2,615,295 | Sishc | Oct. 28, 1952 |